Figure 1:
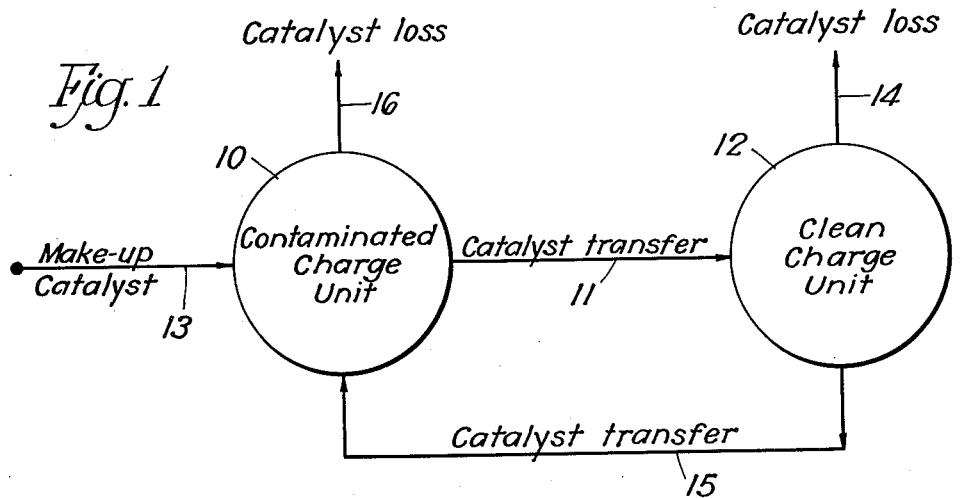

INVENTORS:
Judd W. Healy
Carey W. Brackin
BY Donald E. Payne
ATTORNEY

Patented Oct. 14, 1952

2,614,068

UNITED STATES PATENT OFFICE 2,614,068

MULTIUNIT CATALYTIC CRACKING OPERATIONS

Judd W. Healy, Whiting, and Carey W. Brackin, Crown Point, Ind., assignors to Standard Oil Company, Chicago, Ill., a corporation of Indiana Application May 10, 1949, Serial No. 92,387

6 Claims. (Cl. 196—49)

This invention relates to multiunit catalytic cracking operations and it pertains, more particularly, to the catalytic cracking of clean and contaminated charging stocks, respectively, in different units wherein the over-all utility and effectiveness of the catalyst is markedly enhanced by catalyst transfer from one unit to the other.

The invention is particularly applicable to fluid-type catalytic cracking operations but many features and advantages thereof are also applicable to moving bed catalytic operations such as the so-called Thermo for catalytic cracking (T. C. C.) and Houdri-flow catalytic cracking processes. An object of the invention is to increase the over-all effectiveness of catalyst employed when a clean charging stock is cracked in one unit and a contaminated charging stock is cracked in the other unit. A further object is to provide an improved method and means for improving the activity of a catalyst which has become deactivated by non-hydrocarbon contaminants such as sulfur, sulfur compounds, or metals such as sodium, copper, zinc, iron, nickel, vanadium, etc. A further object is to decrease the carbon-forming tendency and the gas-forming tendency of catalyst contaminated with sulfur and/or metal impurities, simultaneously with utilization of the catalyst for cracking clean charging stocks. Other objects will be apparent as the detailed description of the invention proceeds.

It has been discovered that a cracking catalyst which has become deactivated by sulfur and/or metal impurities (and which, for this reason, tends to produce excessive amounts of carbon and gas in catalytic cracking operations) can be markedly improved in activity by simply using it to crack a clean charging stock, particularly if the cracking temperature is upwardly of about 850° F. We utilize this phenomena in practicing our invention by transferring catalyst from a unit which is cracking contaminated charging stock (preferably from the regenerator of said unit) to a unit which is cracking clean charging stock. Thus, all of the fresh make-up catalyst may be introduced into the unit which is cracking contaminated charging stock, which is important because such a unit requires a high catalyst replacement rate. The make-up catalyst for the unit handling clean charging stock is supplied from the unit handling contaminated charge. The partially deactivated catalyst, which is thus introduced to the clean charge unit, is at least partially freed from contaminants in said clean-charge unit so that its activity is enhanced and it has less tendency to form carbon and gas. The catalyst loss for the clean-charge unit is thus supplied entirely by catalyst transferred from the contaminated charge unit. Furthermore, catalyst may be additionally transferred from the clean charge unit back to the contaminated charge unit so that a given catalyst activity may be maintained in both units with less total make-up catalyst than would otherwise be required. The actual cracking operation on clean charging stock is utilized for eliminating catalyst contaminants or deactivating said contaminants and for improving the activity of a catalyst which has been deactivated by contact with a contaminated charge.

Figure 2:
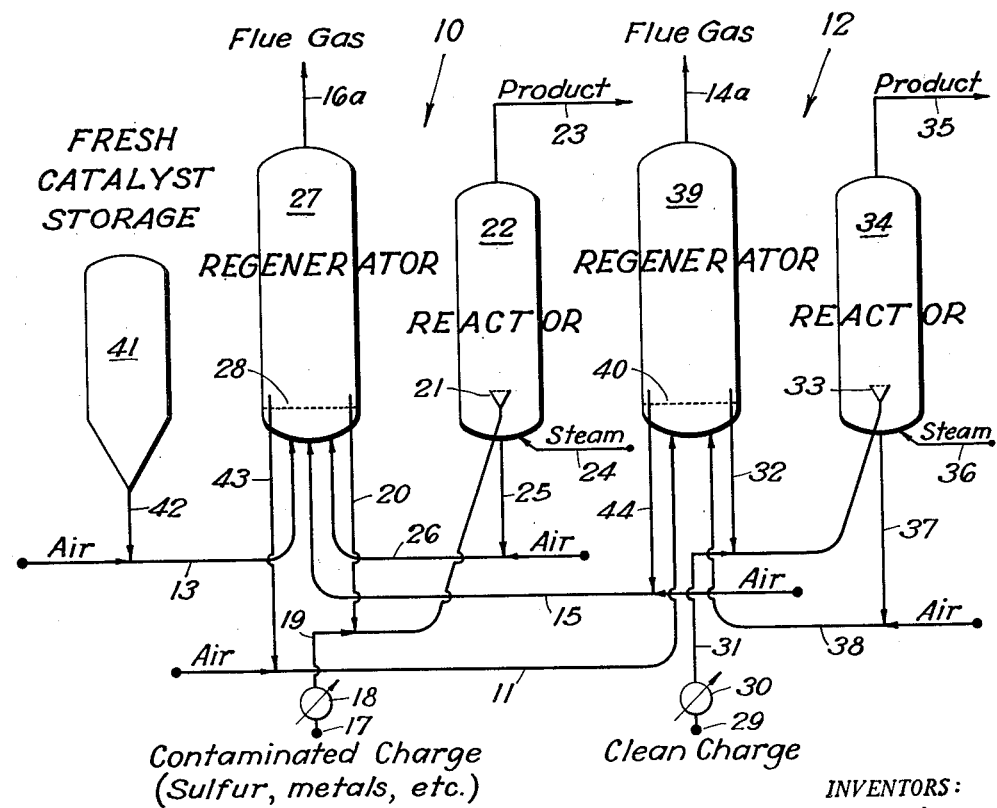

The invention will be more clearly understood from the following detailed description thereof, read in conjunction with the accompanying drawings in which:

Figure 1 is a flow diagram illustrating catalyst transfer between two catalyst units, and Figure 2 is a flow diagram schematically illustrating the application of the invention to two fluid catalytic cracking units.

While the invention is applicable generally to solid catalysts for cracking hydrocarbons, it is particularly advantageous with the so-called "natural" catalyst such as Superfiltrol, which is an acid-treated montmorillonite clay. Such catalyst is commonly referred to as natural silica-alumina catalyst as distinguished from synthetic silica-alumina catalyst which are well known in the art. The invention is also applicable to synthetic silica-alumina catalyst, particularly with respect to metal contaminants and it is believed that the invention is generally applicable to solid catalysts of the type employed in catalytic cracking operations.

The contaminated charge is one which contains non-hydrocarbon impurities such as metals, salts, sulfur, sulfur compounds, nitrogen compounds, etc. Gas oils which contain 1% or more of sulfur are in the category of contaminated charging stocks. An outstanding example of such a contaminated charge is the gas oil obtained from West Texas crude which gas oil may contain about 2% sulfur. Mid-Continent gas oil, on the other hand, is an example of a clean charge since its sulfur content is only about .1 to .2%. While no quantitative analyses have been made of the metal contaminants in these particular gas oils, it is believed that the West Texas gas oil container a higher proportion of metal contaminants. Metal contaminants are, of course, more prevalent in topped crude than in gas oil fractions. A synthetic silica-alumina catalyst which had been employed for fifty-seven days on a continuous reduced crude cracking was found to contain the following metal contaminants before and after three days on-stream with a clean gas oil charging stock:

| Quantitative Spectrographic Analyses, wt. percent | Before | After |
|---|---|---|
| Nickel | .0046 | .0039 |
| Vanadium | .013 | .010 |
| Manganese | .075 | .067 |
| Lithium | .029 | .023 |

Other metallic impurities were substantially the same before and after the catalyst use on clean gas oil charge; these included sodium 0.87%, copper 0.001%, zinc 0.05% and iron 0.93%. It is significant to note that there was an actual increase in catalyst activity after it had been employed for this short time on clean charging stock, apparently due to a deactivation of the contaminants which decreased their harmful effects. Without further treatment of deactivated catalyst thus subsequently employed to crack clean charging stock, its coke producing tendency (as determined in fixed bed tests) decreased about 33%, and its gas producing tendency (likewise determined in fixed bed tests) decreased about 21%.

A natural silica-alumina catalyst which had been partially deactivated by the cracking of West Texas gas oil was subsequently employed for the cracking of Mid-Continent gas oil, one test being for thirty-six hours at 900° F., and a second test being for twenty-four hours at 950° F. The use of the deactivated catalyst for cracking clean stock at 900° F. (i. e., alternate conversion and regeneration, with approximately ten minute catalyst holding time in the reactor) gave an increase in Indiana Relative Catalyst Activity[1] from 23.6 to 25.8, reduced tendency to form carbon by about 21% and reduced tendency toward forming gas by about 14%. At the higher temperature of 950° F. and with only twenty-four hours operation in the cracking of clean charge, the catalyst activity increased from 26.1 to 29.9, its tendency to form carbon decreased by about 50%, and its tendency to produce gas decreased by about 29%. The higher temperature for the cracking of the clean charging stock thus brings about catalyst improvement at a more rapid rate.

In commercial operations, marked advantages may be obtained by transferring catalyst from a unit 10 (Figure 1), in which contaminated charge is cracked (preferably from the regeneration side of said unit) by line 11 to a unit 12, in which clean charge is undergoing cracking so that the total make-up catalyst can be introduced by line 13 into the unit 10, which is handling the contaminated charge. In other words, catalyst losses 14 for the unit handling clean charge is supplied by the introduction of partially deactivated catalyst from the unit handling contaminated charge,

[1] Proceedings of the American Petroleum Institute (vol. 27 (3), page 57, 1947).

instead of from fresh make-up catalyst. In order to continuously reactivate catalyst in a unit handling contaminated charge, catalyst may be continuously cycled between the two units by line 15. It should be understood, of course, that deactivation by charge contaminants is an altogether different phenomena than the accumulation of carbonaceous deposits which are periodically removed in all cases by regeneration. Each of the units 10 and 12 is provided with its respective regenerator, and in each of these units there is normally a certain catalyst loss, chiefly with flue gases, the catalyst loss from unit 10 being via line 16, and from unit 12 being via line 14.

In Figure 2, the invention is illustrated as applied to a plurality of fluid catalytic cracking units. A contaminated charge from source 17 may be preheated in heater 18 and the preheated charge in transfer line 19 picks up hot regenerated catalyst from standpipe 20 and introduces it by distributor 21 into reactor 22 of unit 10, the product stream being withdrawn through line 23 for fractionation. Catalyst from the lower part of reactor 22 is stripped with steam introduced by line 24 and then withdrawn through standpipe 25 from the base of which it is transferred by an air stream through line 26 to the base of regenerator 27, a grid 28 being employed for distributing the solids suspension and any additional air which is introduced. Flue gases are vented from the top of the regenerator by line 16a, and in a 10,000 barrel per day unit catalyst losses may be of the order of about three tons per day. Regenerated catalyst is then returned to the reactor, as above described, and a portion of the regenerated catalyst may be recycled through a cooler (not shown) in accordance with known commercial practice.

A clean charging stock from source 29 may be preheated in heater 30 and passed by transfer line 31 together with hot regenerated catalysts from the base standpipe 32 through distributor 33 into reactor 34 of the clean charge unit 12, the product stream being withdrawn through line 35 for fractionation. Catalyst at the lower part of the reactor may be stripped by steam from line 36 and then withdrawn by standpipe 37 from the base of which it is picked up by air and carried by line 38 to the base of regenerator 39 wherein it is distributed by grid 40. The flue gas from regenerator 39 is vented from the atmosphere by line 14a and here again the loss in a 20,000 barrel per day unit may be of the order of three tons per day.

Heretofore, each unit has been operated independently and make-up catalyst has been supplied to each unit to compensate for catalyst losses and to maintain a desired catalyst activity. In accordance with our invention, fresh active make-up catalyst from storage 41 is picked up from the base of standpipe 42 with air, or other conveyor gas, and conveyed by line 13 to regenerator 27. While it is preferred to introduce the make-up catalyst directly into the regenerator of unit 10, it should be understood that the make-up catalyst may be added to transfer line 19 or may be introduced by steam into reactor 22. In this particular example, about six tons per day of natural silica-alumina catalyst is thus introduced into a 20,000 barrel per day unit 10, which is cracking a West Texas charging stock contaminated with large amounts of sulfur, as well as with small amounts of metals. A dense phase catalyst mass of about 500 to 600 tons may be maintained in the regenerator, and about 250 to 300 tons in the reactor, the catalyst circulation rate being approximately 875 tons per hour. The reactor may be operated at about 850° to 1,000°, e. g., about 925° F. with a top pressure of about 12 p. s. i. g. and the regenerator at about 1050° F. with a top pressure of about 10 p. s. i. g. The upward gas velocity in the reactor and regenerator is preferably in the range of 1 to 1.5 ft. per second in order to maintain the desired turbulent dense phase conditions and internal cyclones (not shown) are employed for assisting in catalyst disengagement from gases and vapors withdrawn from the top of the reactor and regenerator, respectively.

Catalyst withdrawn from regenerator 27 of unit 10 by standpipe 43 is conveyed by air, or other conveyor gas, through line 11 to the base of regenerator 39, in order to supply make-up catalyst for unit 12. Here again, the make-up catalyst may, of course, be introduced into the reactor, instead of the regenerator, in which case catalyst from the base of standpipe 43 may be introduced into transfer line 31, or may be introduced by steam directly into reactor 34. In this specific example, about 4 to 40 tons per day of catalyst is thus transferred from unit 10 to unit 12, the reactor of the latter operating with approximately the same amount of catalyst as the former, but preferably operating at a high temperature, e. g., about 950° F. and operating on a clean Mid-Continent gas oil charge. Based on catalyst inventory in unit 10, the 4 to 40 tons per day transferred to unit 12 is only about .5 to 5%. In unit 12 there will be a stack loss of approximately three tons per day via line 14a but the catalyst loss will be supplied by the relatively deactivated catalyst from unit 10 instead of by fresh active catalyst. The stack loss or catalyst depletion from each unit is thus only a fraction of a per cent of the catalyst circulated in such unit; in this particular example the catalyst circulation rate in each unit is about 875 tons per hour or 21,000 tons per day while the daily catalyst depletion or loss is only about 3 tons per day. About 1 to 37 tons per day of catalyst may be withdrawn from regenerator 39 through standpipe 44 and returned by air, or other conveyor gas, through recycle line 15 to the base of regenerator 27; alternatively, of course, this catalyst may be returned by transfer line 19 or by an additional transfer line (not shown) directly to reactor 22.

From the above description, it will be seen that we have accomplished the objects of our invention. Catalyst, which has become deactivated by repeated cracking and regeneration operations in unit 10, is transferred to unit 12 for the cracking of clean charging stock and the simultaneous improvement of the catalyst with respect to activity and selectivity. Catalyst losses from the clean charge unit are supplied entirely by the introduction of relatively deactivated catalyst. Catalyst which has been improved with respect to activity and selectivity is returned for further use in cracking contaminated charging stock.

Although the invention has been specifically described in connection with fluid catalytic cracking, it will be apparent that it is also applicable to moving bed catalytic cracking processes. Further details in connection with the cracking and regeneration operations per se require no further discussion since they are well known to those skilled in the art.

We claim:
1. The method of effecting catalytic cracking with solid cracking catalyst in separate cracking units each of which contains its respective cracking zone and regeneration zone, which method comprises continuously circulating a first catalyst stream in a first unit cycle which includes a first cracking zone and a first regeneration zone and from which there is an average daily catalyst depletion amounting to only a fraction of a per cent of the catalyst circulated, continuously circulating a second catalyst stream in a second unit cycle which includes a second cracking zone and a second regeneration zone and from which there is an average daily catalyst depletion amounting to only a fraction of a per cent of the catalyst circulated, both cycles requiring addition of make-up catalyst to compensate for catalyst depletion, introducing into the first cracking zone a charging stock containing contaminants which tend to deactivate the catalyst, introducing into said second cracking zone a charging stock which is substantially free from said contaminants, transferring partially deactivated catalyst from said first unit cycle as make-up catalyst to said second unit cycle during the continuous operation thereof in amounts at least sufficient to compensate for catalyst depletion in the second cycle and introducing fresh catalyst to the first unit cycle in amounts sufficient to compensate for total catalyst depletion in both of said cycles.

2. The method of claim 1 wherein the catalyst is a silica alumina catalyst and the contaminants consist essentially of both sulfur contaminants and metal contaminants.

3. The method of claim 1 wherein the catalyst is a natural silica alumina catalyst and the contaminants consist essentially of sulfur compounds.

4. The method of claim 1 wherein the catalyst particles are maintained in fluidized form throughout both unit cycles and wherein dense phases of fluidized catalyst is maintained in each reaction and regeneration zone.

5. The method of operating a first and second fluid catalytic cracking unit, which method comprises introducing a charging stock contaminated with sulfur compounds and metal compounds at the base of the reaction zone of the first unit together with catalyst from the regeneration zone of the first unit, cracking said charging stock in the reaction zone of the first unit whereby contaminants are deposited on the catalyst, continuously transferring catalyst from the reaction zone of the first unit to the regeneration zone of the first unit and continuously returning an average of more than 99% of the regenerated catalyst withdrawn from the regeneration zone of the first unit back to the reaction zone of the first unit, introducing a charging stock substantially free from catalyst contaminants into the reaction zone of the second unit together with regenerated catalyst from the regeneration zone of the second unit, cracking said last-named charging stock in said reaction zone of the second unit, continuously transferring catalyst from the reaction zone of the second unit to the regeneration zone of the second unit and returning an average of more than 99% of the catalyst withdrawn from the regeneration zone of the second unit to the reaction zone of the second unit, withdrawing from the regeneration zone of the first unit on a daily basis about .5 to 5% of the total catalyst inventory in the first unit and introducing said last-named withdrawn catalyst into the regeneration zone of the second unit, and introducing into the regeneration zone of the first unit sufficient make-up fresh catalyst to supply the total catalyst depletion in both units.

6. The method of claim 5 which includes the further step of transferring from the regeneration zone of the second unit to the regeneration zone of the first unit an amount of catalyst equivalent to that transferred from the regeneration zone of the first unit to the regeneration zone of the second unit less catalyst losses in the second unit.

JUDD W. HEALY.
CAREY W. BRACKIN.

REFERENCES CITED

The following references are of record in the file of this patent:

UNITED STATES PATENTS

| Number | Name | Date |
|---|---|---|
| 2,349,574 | Conn | May 23, 1944 |
| 2,378,531 | Becker | June 19, 1945 |
| 2,382,755 | Tyson et al. | Aug. 14, 1945 |
| 2,432,912 | Loeb | Dec. 16, 1947 |
| 2,436,618 | Sweeney | Feb. 24, 1948 |
| 2,437,222 | Crowley et al. | Mar. 2, 1948 |
| 2,447,577 | Hemminger et al. | Aug. 24, 1948 |
| 2,450,724 | Grote | Oct. 5, 1948 |
| 2,461,958 | Bonnell | Feb. 15, 1949 |